J. S. REYNOLDS.
CUTTING AND WELDING TORCH.
APPLICATION FILED FEB. 17, 1919. RENEWED AUG. 18, 1920.
1,369,545.
Patented Feb. 22, 1921.
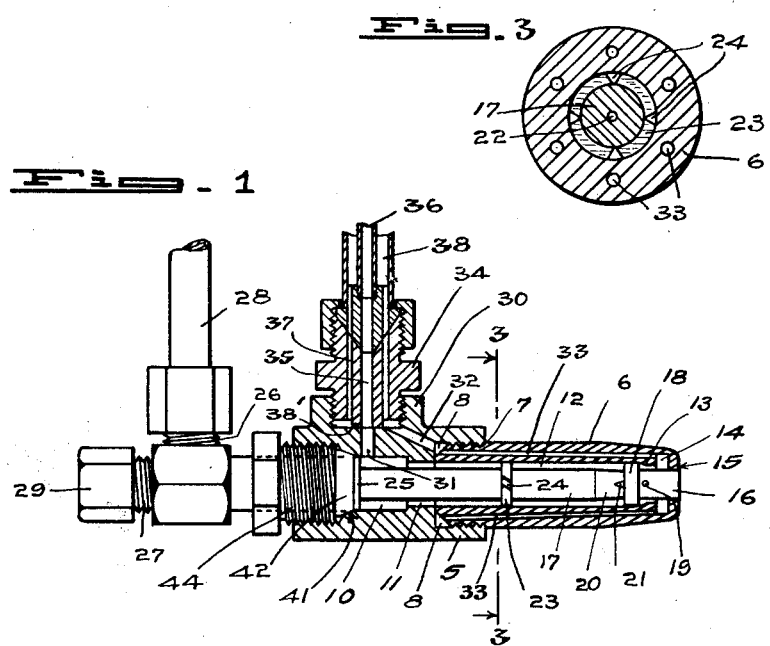
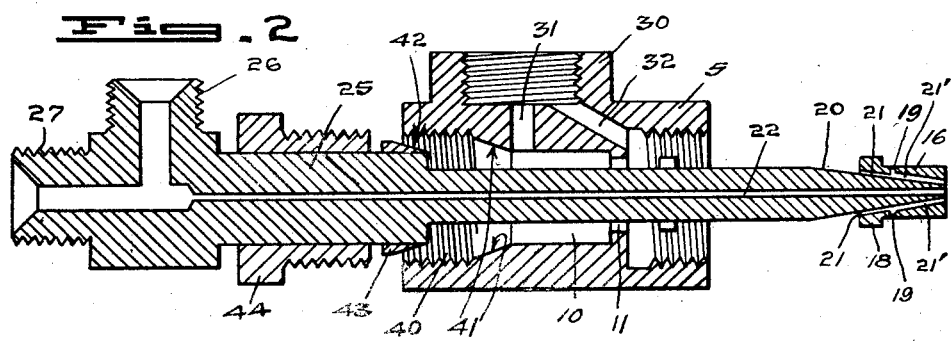
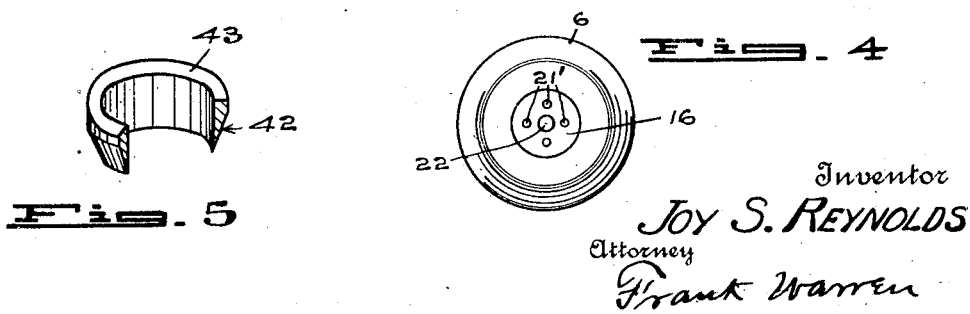
Inventor
JOY S. REYNOLDS
Attorney
Frank Warren

UNITED STATES PATENT OFFICE.

JOY S. REYNOLDS, OF SEATTLE, WASHINGTON, ASSIGNOR TO REYNOLDS TORCH MANUFACTURING COMPANY, OF SEATTLE, WASHINGTON.

CUTTING AND WELDING TORCH.

1,369,545. Specification of Letters Patent. Patented Feb. 22, 1921.

Application filed February 17, 1919, Serial No. 277,681. Renewed August 18, 1920. Serial No. 404,476.

*To all whom it may concern:*

Be it known that I, JOY S. REYNOLDS, citizen of the United States, residing at Seattle, in the county of King and State of Washington, have invented a certain new and useful Improvement in Cutting and Welding Torches, of which the following is a specification.

My invention relates to improvements in cutting and welding torches and the object of my invention is to provide a torch wherein the oxygen and inflammable gas may not mix before reaching the tip of the torch thereby eliminating any back firing therein.

A further object of my invention is to provide a new and efficient form of gas tight connection between external tubular members and stems that pass therethrough such form of connection having few parts and being constructed so that it will not become permanently distorted or loosened by heat and wear and will permit a longitudinal adjustment of the stem within the external tubular member.

I accomplish these objects by devices illustrated in the accompanying drawings, wherein—

Figure 1 is a view in longitudinal midsection of a torch constructed in accordance with my invention, certain parts being shown in elevation;

Fig. 2 is an enlarged view in longitudinal mid-section of certain parts of my invention, the members forming the gas tight joint being shown disconnected;

Fig. 3 is an enlarged view in cross-section on broken line 3, 3 of Fig. 1;

Fig. 4 is a view in elevation of the tip end of the torch; and

Fig. 5 is a view in perspective, with parts broken away, of a frusto-conical shaped washer used in forming the gas tight connection.

Referring to the drawings, throughout which like reference numerals indicate like parts, the numerals 5 and 6 designate the two parts forming the exterior casing of the head of a torch, the part 5 being provided on one end with an internally threaded socket for the reception of the externally threaded end 7 of the part 6 and the outer annular edge of the end 7 being beveled so that when the part 6 is screwed into the part 5, an annular gas passageway 8 of substantially triangular cross sectional shape is formed.

The casing section 5 is provided with an axial chamber 10 of relatively large diameter and with another axial chamber 11 of smaller diameter that communicates with the larger chamber 10 and also communicates with a chamber 12 of the same diameter in the casing section 6.

The chamber 12 converges as at 13 near the tip thence expands to form an internal annular groove 14 and thence terminates in a tip portion 15 of reduced diameter that is adapted to snugly fit the peripheral wall of the tip portion 16 of a tubular stem 17.

The stem 17 is provided with a collar 18 that is adapted to fit snugly within the passageway 12 just above the converging portion 13 so that the converging portion 13 acts as a stop for the collar 18 and insures a gas tight fit between such collar and the inner peripheral walls of the passageway 12.

The stem 17 converges slightly as at 20 just above the collar 18 and is provided at the point of its junction with such collar with a plurality of fine perforations 21 that extend angularly forward until they intersect larger perforations 21′ which terminate in the end of the stem, the perforations 21 and 21′ forming continuous passageways through which gas, as oxygen, from the chamber 12 may flow.

Intersecting the passageways just described at the junction of the smaller perforations 21 and larger perforations 21′ are substantially radial perforations 19 through which gas, as acetylene, may enter from the annular chamber 14, the oxygen and acetylene coming together and mixing within the passageways 21′ just before being emitted from the torch.

Extending lengthwise axially of the stem 17 is a passageway 22 through which a jet of oxygen may pass and be emitted from the center of the torch tip as indicated in Fig. 4.

The stem 17 is provided about mid-way of its length with a collar 23 which serves to center the stem within the passageway 12, the collar 23 being provided with angular notches 24 through which gas may flow.

The outer end of the stem 17 is enlarged as at 25 and terminates in two nipples 26 and 27 one of which is disposed axially of the stem and the other of which is disposed at right angles thereto whereby either one of said nipples may be connected with an oxygen inlet pipe 28, the other nipple being closed as by a cap 29.

The casing section 5 is provided on one side with an internally threaded boss or nipple 30 that communicates by an axial passageway 31 with the chamber 10 and by another angular passageway 32 with the annular passageway 8 at the base of the casing member 6.

The casing member 6 is provided with a plurality of small tubular passageways 33 that extend lengthwise thereof between the annular passageway 8 and the annular groove 14 and serve as conduits for inflammable gas, as acetylene.

The nipple 30 is adapted for the reception of a fitting 34 having an axial passageway 35 that communicates with an oxygen inlet pipe 36 and a plurality of other passageways 37 that communicates with a gas inlet pipe 38, the bottom end of the fitting 34 having a centrally arranged protruding boss 38' through which the passageway 35 extends and which abuts against the bottom wall of the recess in the nipple 30 thereby establishing separate communication between the passageways 35 and 31 and the passageways 37 and 32 as more clearly shown in Fig. 1.

The gastight joint which constitutes one of the novel features of my invention is made between the interior of the casing section 5 and the exterior of the stem section 25 by forming an internal thread 40 in the end of the casing section and providing a convergent annular conical seat 41 at the end of the thread, the seat 41 being adapted for the reception of the conical exterior annular surface 42 of a relatively thin sleeve 43 that fits snugly over the stem section 25 and is adapted to be held in place by an externally threaded bushing 44 that screws into the threaded portion 40 of the casing section 5.

When the bushing 44 is screwed tightly against the sleeve 43 as shown in Fig. 1, the sleeve is crowded firmly into the conical seat 41 and forms a gastight joint therewith while the external pressure due to the evenly distributed wedging effect of the two annular conical surfaces 41 and 42 causes the relatively thin sleeve 43 to be slightly contracted or compressed against the exterior peripheral surface of the stem section 25 thereby forming a gastight joint.

The wedging effect of the sleeve 43 when it is forced against the seat 41 by screwing the bushing 44 inwardly forms a friction lock between the stem section 25 and the casing section 5 which holds the stem rigid, but when the bushing 44 is withdrawn this wedging effect is not present and the stem may be moved lengthwise or rotated within the casing members.

When my torch is used for cutting purposes oxygen under a relatively low pressure is admitted through the pipe 36 and flows through passageways 35 and 31 into the chambers surrounding the stem 17 from whence it flows through the passageways 21 into the passageways 21' where it is mixed with acetylene gas that has entered through the pipe 38, passageways 37, passageway 32, passageways 33, annular groove 14 and perforations 19 and the mixed gases are emitted from the torch tip.

At the same time oxygen under higher pressure is permitted to flow through the passageway 22 and be emitted from the torch tip between the jets of inflammable mixed gas.

From the above description it will be obvious that the oxygen and the acetylene gases enter through separate passageways and do not mix until they reach the tip of the torch thereby making it impossible for the torch to back fire.

It will be understood that changes may be made in the form and dimensions of my invention without departing from the spirit thereof.

What I claim is:

1. A torch of the class described comprising an outer casing having separate passageways for oxygen and a circular series of passageways for acetylene gas and a stem disposed within said outer casing surrounded by said passageways, the tip of said stem having intersecting perforations that make separate connections with the oxygen and acetylene gas passageways in said casing whereby the oxygen and acetylene will be mixed in the tip of said stem just prior to its exit from said torch.

2. A torch of the class described comprising an outer casing having separate sets of passageways for conducting two different gases to points adjacent the tip thereof, one set of said passageways being in circular series, and a stem having perforations adjacent its tip that make separate connections with each of said gas passageways said perforations intersecting each other and uniting to form single passageways wherein the two gases are mixed and through which they are emitted from the tip of said torch.

3. A torch of the class described, comprising an outer casing having separate sets of passageways for conducting two different gases to a point adjacent the tip thereof, one set of said passageways being in circular series and a stem having an axial bore and having perforations adjacent its tip that make separate connections with each of said gas passageways in said outer casing, said perforations intersecting each other being separated by a member having a gas tight connection with the inner face of the casing and uniting to form single passageways wherein the two gases are mixed and through which they are emitted from the tip of said torch at a plurality of points around the terminal opening of said axial bore in said stem.

4. A torch of the class described, comprising an outer casing having an axial bore, and having longitudinally extending passageways formed in the walls surrounding said bore, a stem disposed within said axial bore said stem being of less diameter than said bore and having an axial passageway therein and the tip of said stem having connected passageways that communicate with the space around said stem and the passageways in the wall of said casing respectively and wherein oxygen and inflammable gas may be mixed just before being emitted from said torch.

5. A torch of the class described, comprising an outer casing having an axial passageway for conducting oxygen gas to a point near the tip of said torch and provided with separate passageways in the walls thereof for conducting acetylene gas to a point near the tip of said torch, a stem of less diameter than said axial passageways and disposed therein said stem having a central bore extending lengthwise thereof, means for delivering oxygen into said central bore, an annular collar formed on the outer end of said stem and adapted to make a gastight fit within the axial passageway of said casing adjacent the tip end thereof the tip end of said stem having angularly disposed perforations that extend from the rear side of said collar to the end of said stem to afford passageways for oxygen and other perforations extending inwardly from the outer walls of said stem in front of said collar and intersecting said first named perforations to afford passageways for acetylene said first named perforation being largely in diameter between the end of said tip and the point where they intersect said last named passageways and the oxygen and acetylene gases mixing in said passageways.

6. A torch of the class described comprising an outer casing formed of a body portion and a tip portion said body portion having an internally threaded socket for the reception of the inner end of said tip portion, the end of said tip portion being beveled to afford an annular passageway when it is screwed within said body portion, said body portion and said tip portion having alined axial passageways and said tip portion having passageways in the walls thereof that connect with said annular passageways and an internal annular groove adjacent its outer end in which said wall passageways terminate, gas conduit means arranged to deliver oxygen into said axial passageways, other gas conduit means adapted to deliver acetylene gas into said annular passageways, a stem of less diameter than said axial passageways and disposed therein, said stem having a central bore extending lengthwise thereof, means for delivering oxygen into said central bore, means for forming a gas tight connection between the body portion of said casing and said stem, an annular collar formed on the outer end of said stem and adapted to make a gastight fit within the axial passageway of said casing adjacent the annular groove in the tip end thereof, the tip end of said stem having angularly disposed perforations that extend from the rear side of said collar to the end of said stem to afford passageways for oxygen and other perforations extending inwardly from the outer walls of said stem in front of said collar and intersecting said first named perforations to afford passageways for acetylene said first named perforations being of larger diameter between the end of said tip and the point where they intersect said last named passageways whereby the oxygen and acetylene gases may mix in said passageways.

7. A torch of the class described including an outer casing having a circular series of passageways, a stem within said casing, means carried by said stem in frictional engagement with the inner wall of said casing, said stem having a central longitudinal passageway, and a circular series of passageways with the opposite ends of each passageway communicating with the interior of the casing at opposite sides of said means, and gas and oxygen supply means for said passageways.

8. A torch of the class described, including an outer casing having a circular series of passageways, a stem within said casing, and having a longitudinal central opening inwardly of said circular series of openings, the forward end of said stem having inclined openings extending inwardly from the tip end and communicating with one of the casing passageways, means carried by said stem in frictional engagement with the inner wall of said casing, said stem having openings therein outwardly of the last named means for establishing communication between the other casing passageway and the inclined openings.

In witness whereof I hereunto subscribe my name this 6th day of February A. D. 1919.

JOY S. REYNOLDS.